(12) United States Patent
Chen et al.

(10) Patent No.: US 11,727,017 B2
(45) Date of Patent: Aug. 15, 2023

(54) METHODS FOR INTROSPECTING CODE IN A MULTI-TENANT ENVIRONMENT

(71) Applicant: Salesforce, Inc., San Francisco, CA (US)

(72) Inventors: Nicholas Chun Yuan Chen, San Francisco, CA (US); Lovi Yu, Folsom, CA (US); Christopher Peterson, South San Francisco, CA (US); Christopher Alan Ebert, Berkeley, CA (US); Michael Goldberg Boilen, Kirkland, WA (US); Samantha Reynard, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/940,867

(22) Filed: Jul. 28, 2020

(65) Prior Publication Data
US 2022/0035821 A1  Feb. 3, 2022

(51) Int. Cl.
*G06F 16/00*     (2019.01)
*G06F 16/2457*   (2019.01)
*G06F 16/242*    (2019.01)
*G06F 16/28*     (2019.01)
*G06F 16/2452*   (2019.01)
*G06F 16/2455*   (2019.01)

(52) U.S. Cl.
CPC .... *G06F 16/24575* (2019.01); *G06F 16/2433* (2019.01); *G06F 16/24524* (2019.01); *G06F 16/24553* (2019.01); *G06F 16/288* (2019.01)

(58) Field of Classification Search
CPC .......... G06F 16/24575; G06F 16/2433; G06F 16/24524; G06F 16/24553; G06F 16/288; G06F 16/21; G06F 8/315; G06F 8/75
See application file for complete search history.

(56) References Cited

U.S. PATENT DOCUMENTS

| | | | |
|---|---|---|---|
| 7,730,478 B2 * | 6/2010 | Weissman | G06F 21/6227 717/171 |
| 10,296,440 B2 | 5/2019 | Gamble et al. | |
| 10,397,309 B2 | 8/2019 | Wunderlich et al. | |
| 10,547,601 B2 | 1/2020 | Lipke et al. | |
| 10,586,025 B2 | 3/2020 | Chen et al. | |
| 10,620,935 B2 | 4/2020 | Bartolotta et al. | |
| 10,747,889 B2 | 8/2020 | Edison et al. | |
| 10,891,298 B2 | 1/2021 | Chow et al. | |
| 10,891,357 B2 | 1/2021 | Chen et al. | |
| 11,263,033 B2 | 3/2022 | Boilen et al. | |
| 11,468,229 B2 | 10/2022 | Chen et al. | |

(Continued)

OTHER PUBLICATIONS

Wikipedia, "Semmle," last edited Jun. 15, 2020, downloaded from https://en.wikipedia.org/wiki/Semmle on Jul. 23, 2020, 3 pages.

*Primary Examiner* — Diedra McQuitery
(74) *Attorney, Agent, or Firm* — Nicholson, De Vos, Webster & Elliott, LLP

(57) ABSTRACT

A method and system for code introspection in a multi-tenant architecture. The method includes receiving a query for code introspection from an entity, retrieving context for the entity that sent the query, retrieving raw code information based on the query, filtering the raw code information based on the context, and returning the filtered code information.

21 Claims, 11 Drawing Sheets

(56) References Cited

U.S. PATENT DOCUMENTS

| | | | |
|---|---|---|---|
| 2005/0283478 A1* | 12/2005 | Choi | H04L 67/02 |
| | | | 707/999.009 |
| 2011/0231835 A1* | 9/2011 | Smith | G06F 8/61 |
| | | | 717/174 |
| 2014/0358963 A1* | 12/2014 | Grosset | G06F 16/245 |
| | | | 707/769 |
| 2015/0178055 A1* | 6/2015 | Fee | G06F 9/5027 |
| | | | 717/146 |
| 2018/0285426 A1* | 10/2018 | Chow | G06F 16/25 |
| 2018/0293058 A1* | 10/2018 | Bierman | G06F 11/3624 |
| 2019/0236292 A1 | 8/2019 | Bartolotta et al. | |
| 2019/0340368 A1 | 11/2019 | Eidson et al. | |
| 2019/0342088 A1 | 11/2019 | Eidson et al. | |
| 2020/0019720 A1 | 1/2020 | Chasman et al. | |
| 2020/0120098 A1* | 4/2020 | Berg | H04L 63/104 |
| 2020/0210216 A1 | 7/2020 | Boilen et al. | |
| 2021/0149867 A1 | 5/2021 | Grabill et al. | |
| 2022/0027503 A1 | 1/2022 | Chasman et al. | |

* cited by examiner

METHODS FOR INTROSPECTING CODE IN A MULTI-TENANT ENVIRONMENT

TECHNICAL FIELD

One or more implementations relate to the field of code introspection and reflection; and more specifically, to methods and system for code introspection and reflection in a multi-tenant environment.

BACKGROUND ART

One A multi-tenant system is a shared computing system. The multi-tenant system provides software multitenancy, which refers to a software architecture in which a single instance of a software application runs on a server and serves multiple tenants, where the "tenants" are different organizations, or subscribers to the application or the multi-tenant system. Each organization or subscriber can be associated with a set of users that can access the software application. The users of the software application can access data specific to the user or the organization of the user, but the software application is designed to prevent users to access the data of other organizations or subscribers. The multi-tenant system and the software application can enforce sets of privileges specific to tenants, organizations, subscribers, and/or users.

Multi-tenant systems can be considered shared systems (in contrast to dedicated or isolated system). Thus, with a multitenant architecture, a software application is designed to provide every tenant a dedicated share of the instance of the software application including data, configuration, user management, tenant individual functionality, and similar features and properties. Multitenancy contrasts with multi-instance architectures, where separate software instances operate on behalf of different tenants.

Software applications are developed and deployed into multi-tenant architectures. However, often the tools and features of computing programming languages and software developing environments are not adapted for or designed for use in multi-tenant environments. Thus, developing, testing, and deploying software applications in multi-tenant environments can be more challenging than in dedicated or isolated systems where there is no need to support multiple tenants using the software application and supporting the associated varied privileges associated with different tenants, organizations, subscribers and users.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for code introspection in a multi-tenant architecture. The implementations provide a code introspection service that enables a program or user to submit a query to a database of code information that can locate and retrieve code based on the query expressed in a query language. The results of the query can be filtered based on the permissions of the requesting entity to ensure that the requestor does not aspect code information without appropriate permission.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Figure 1:
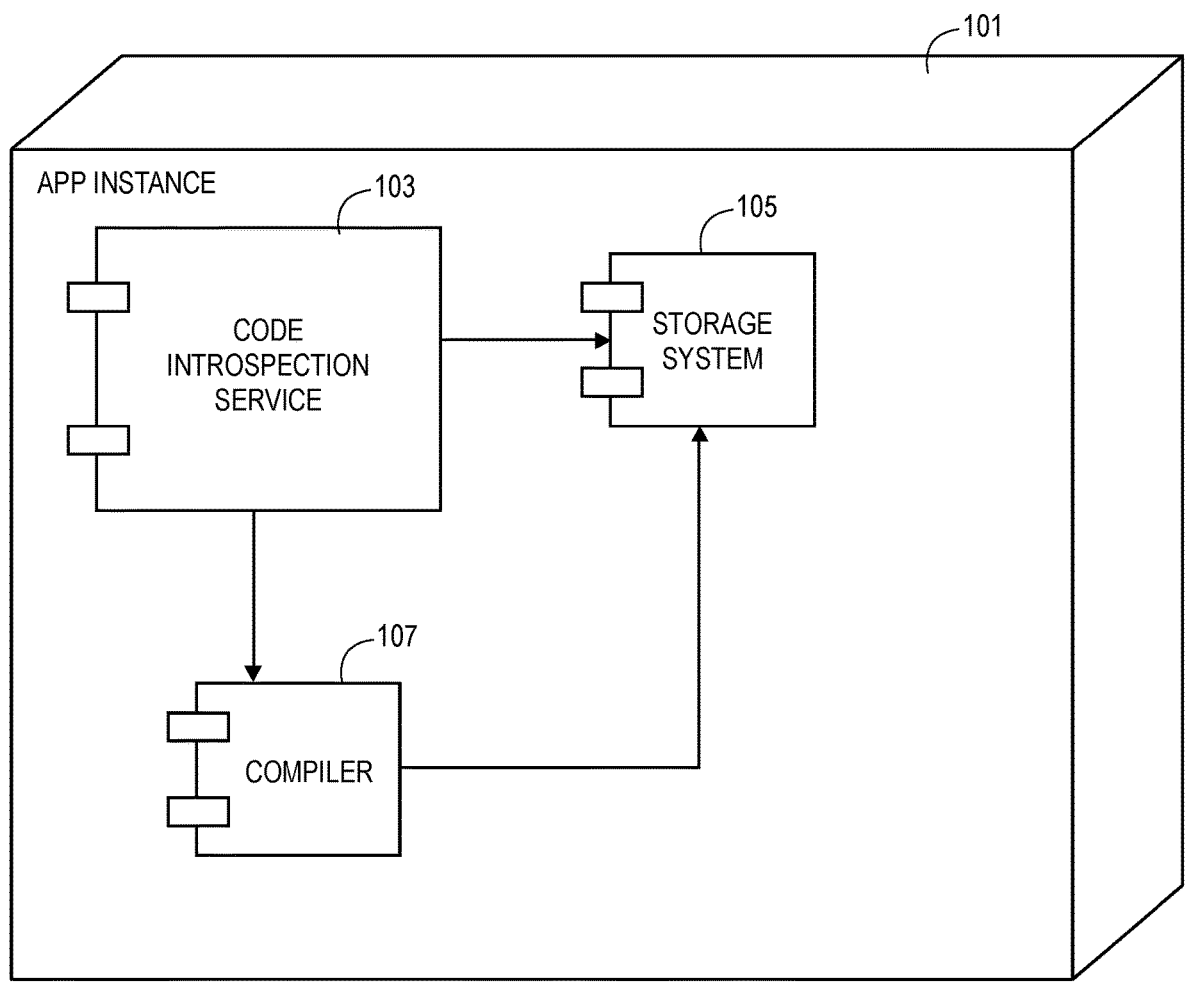
FIG. 1 is a diagram of an application with a code introspection service according to some example implementations.

FIG. 1 is a diagram of an application with a code introspection service according to some example implementations. The code introspection service 103 is a service that is incorporated or called by an application instance 101. The application instance 101 can be any application developed for a multi-tenant architecture. The application instance 101 is an application that is shared by tenants of the multi-tenant architecture. While the application instance 101 is shared by the tenants of the multi-tenant architecture, the storage system 105 and data therein is not shared by the tenants. The code introspection service 103 interfaces with the storage system 105 and/or the compiler 107 to service requests from users of the application instance 101 including user program execution, user command line input, and similar mechanisms by which the user can submit a code inspection query to the code introspection service.

The storage system 105 can be any type of storage system including a database storage system, file system, or similar data storage system. Database systems can include relational database systems, object oriented database systems, and similar database systems, the storage system 105 can be a separate application or set of applications (e.g., database management systems) that operate in the multi-tenant architecture and are accessible via function calls, service, application programming interface (API), or similar mechanism that is embedded within an application instance 101 or accessible to the application instance.

The compiler 107 can be any type of compiler to process tenant code to be executed within or in conjunction with the application instance. The compiler can be a compiler for Apex (by Salseforce.com), Java, C++, or similar programming language. These languages can be used to created modules, add-ins, functions, methods, or other programming components that can be used in conjunction with the application instance 101 to augment the functionality of the application instance 101. The implementations provide support for code introspection or reflection in these programming components. As used herein 'code introspection' is the ability of a function, command, or program to examine the type or properties of other code (e.g., object code) during runtime execution. Similarly, 'code reflection' as used herein refers to the ability of a function, command, or program to modify the values, metadata, functions, or other properties of other code (e.g., object code) during runtime execution. The implementations are described with relation to supporting code introspection in a multi-tenant architecture. However, one skilled in the art would understand that the principles, functions, and structures described herein with relation to code introspection can also be applied to code reflection implementations.

The application instance 101 can utilize any number or variety of compilers 107. For sake of clarity and conciseness, the implementations are described with relation to an application instance working in conjunction with a single compiler 107. However, the processes described herein are also applicable for use with multiple different compilers or similar processes. The compiler 107 can provide the code information that is utilized by the code introspection service 103 to enable code introspection. The compiler 107 can generate a symbol table, abstract syntax tree, and similar code information during the processing of tenant code that is stored partially or entirely within the storage system 105 for subsequent use by the code introspection service. In this manner, the code information collected and stored about each program, module, function, or application, in the multi-tenant architecture can be standardized and made accessible to the cod introspection service.

The code introspection service 103 is a set of function, modules, an API, or similar interface or program to receive requests from the application instance 101 or tenant functions, modules, or programs for code information. For example, a request can be received to identify all classes of module that implement a specific interface. The code introspection service 103 can search the code information in the storage system to identify the code that matches the parameters of a request. In this example, the code introspection service 103 can search for classes that implement the identified interface.

Figure 2:
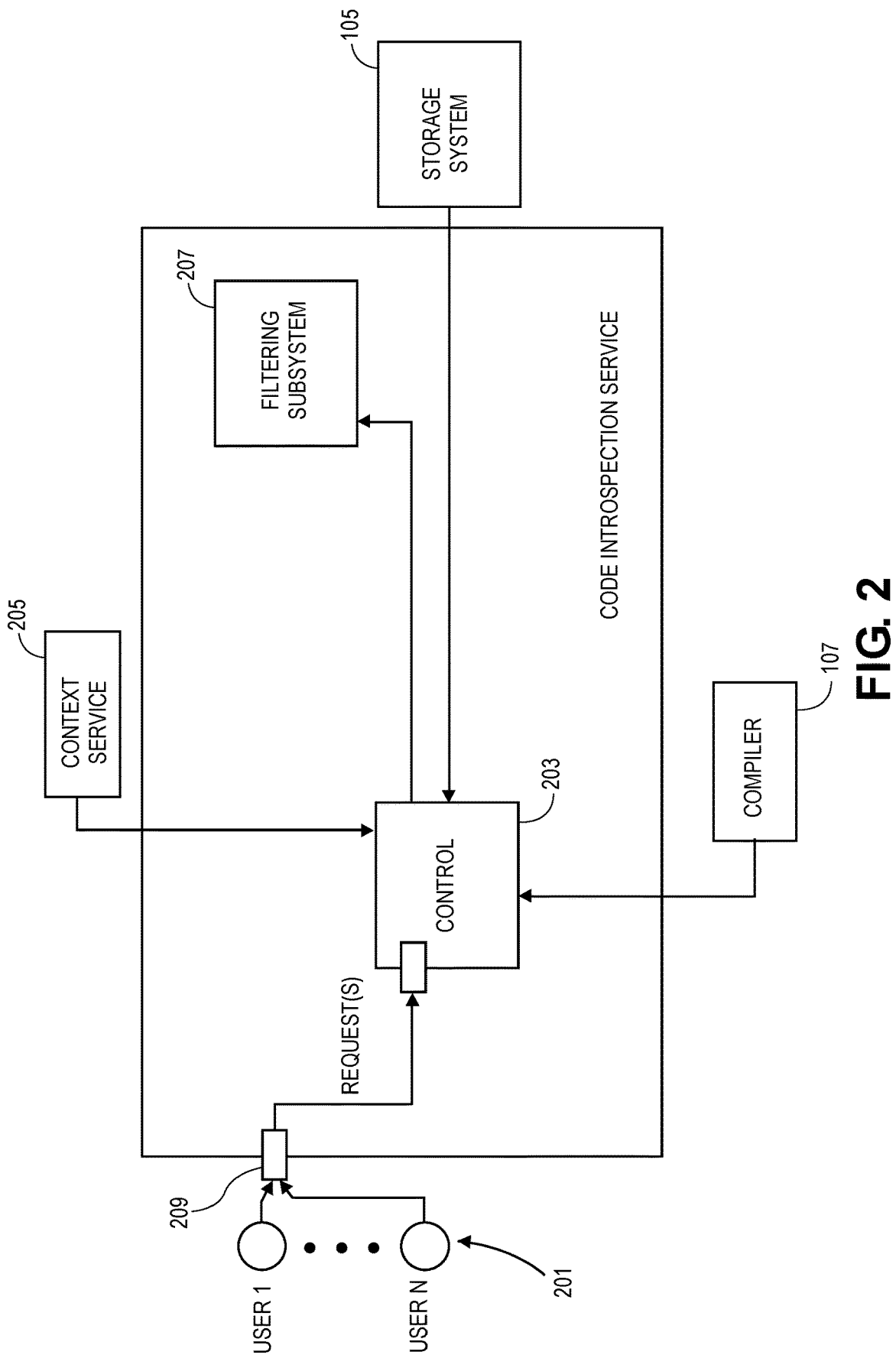
FIG. 2 is a diagram of a code introspection service according to some example implementations.

FIG. 2 is a diagram of a code introspection service according to some example implementations. The operation of the code inspection service 103 and its components are illustrated. The code inspection service 103 includes a controller 203 and filtering subsystem 207. The code inspection service 103 interfaces with storage system 105, compiler 107, and context service 205. The code inspection service receives requests from users 201 via in interface 209. The components of the code introspection service 103 are provided by way of example and not limitation. One skilled in the art would understand that the functions of the code introspection service can be organized into different combinations of components and that the code introspection service 103 components are provided by way of example to illustrate the operation of the code introspection service 103.

The code introspection service 103 can service any number of users 209 of an associated application instance. The users 209 can call the code introspection service or send a request to the code introspection service 103 via any type of interface 209. The calls or requests of the user 209 can originate via any user interface or via any function calls in programs associated with the users 203. Each user 203 is in turn associated with a tenant and/or organization that subscribe to the multi-tenant architecture. The request can have any format and can be received using any protocol. The requests can provide any criteria or set of parameters to identify code information to be returned to the respective users 209. For example, the requests can be in the form of a query using any query language, where the query provides the parameters of the search of the code information.

The requests are received via the interface 209 and provided to the controller 203. The controller parses or similarly processes the request to identify the search terms or query and the user. The controller 203 accesses a context service to obtain permissions information for the user, as well as the organization and/or tenant with which the user is associated. The context service 205 can be accessed using an API or any similar interface. The context service 205 is provided by the multi-tenant architecture, which maintains permissions information for each user, organization, and tenant.

The controller 203 can also search previously compiled code information in the storage system 105 or request that a compiler 107 process relevant code to obtain code information that can be searched using the parameters of the received query. The code information that is provided by the compiler 107 and/or the storage system 105 can have any format or organization. The code information can be symbol tables and/or ASTs for the related code that is generated by the compiler 107 and stored or cached by the multi-tenant architecture in the storage system 105. The code information that matches the parameters of the search or query is returned to the controller 203 by the storage system 105 and/or the compiler 107.

The controller provides the context information (i.e., permissions information associated with the user that sent the request) and the code information to a filtering subsystem 207. The filtering subsystem identifies code information that the user does not have permission to access. All code information is associated with as set of permissions, owners, access controls, or similar information. The context information of the user is utilized to filter the returned code information to remove that code information, which the user does not have permission to access, thereby enforcing the permissions scheme of the multi-tenant architecture. The filtered code information is then returned by the filtering subsystem 207 to the controller 203, which in turn prepares a response to the received request with the filtered code information or similarly returns the filtered code information to the user 201 that requested this code information.

Figure 3:
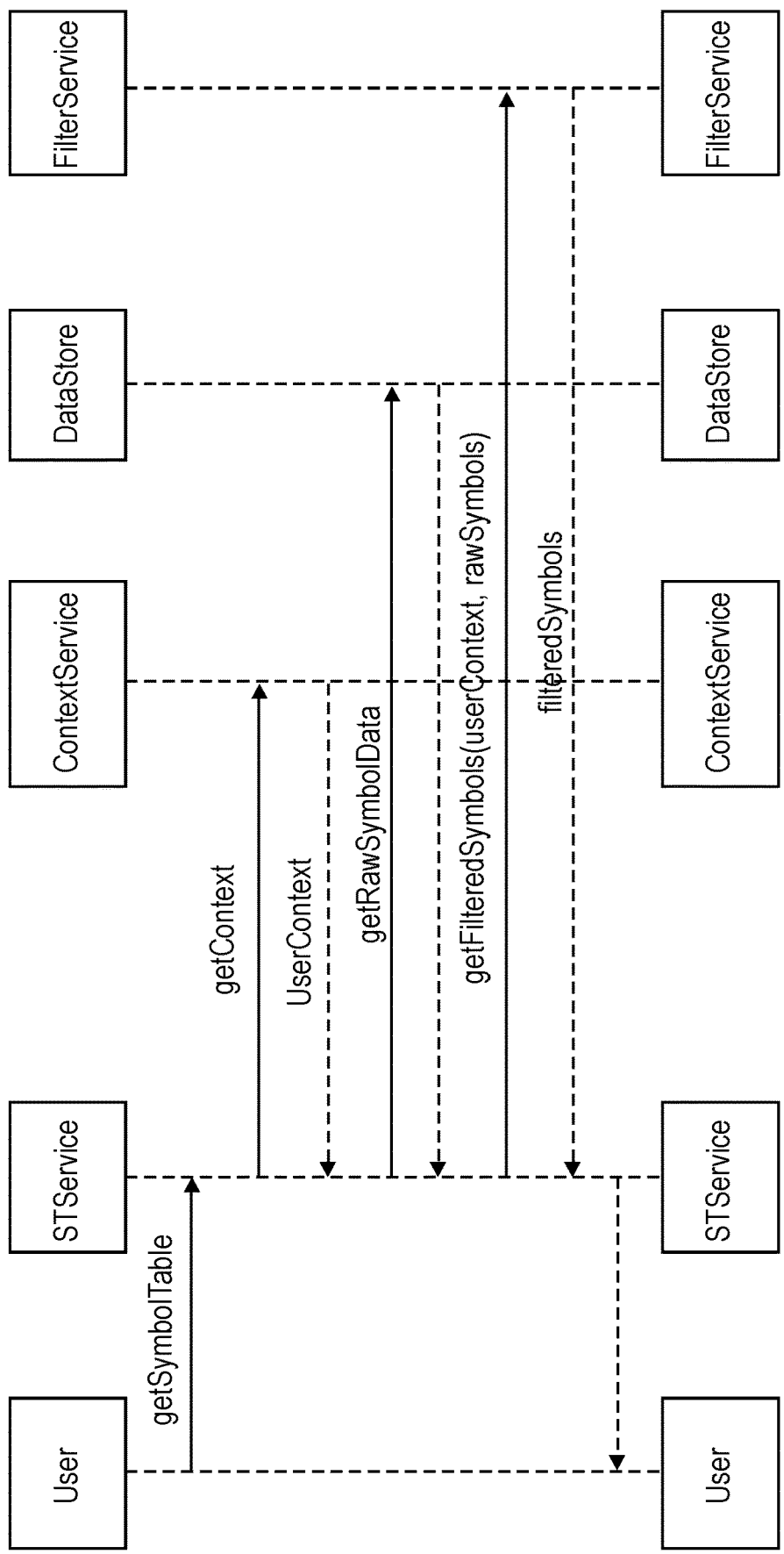
FIG. 3 is a diagram of the function calls related to a code introspection service according to some example implementations.

FIG. 3 is a diagram of the function calls related to an example code introspection service according to some example implementations. In the example of FIG. 3, the code introspection service is a symbol table service (STService), where the code information in this example system is in the form of symbol tables. In this example, a user calls a getSymbolTable function of the STService, which includes the parameters of the query that a user is requesting. The query is in a query language that defines the parameters of the request.

The STService calls a getContext function of the Context Service. The getContext function includes parameters identifying a user, organization, or tenant of the multi-tenant architecture. The Context Service returns the user context information (i.e., the permissions associated with the user/organization/tenant). The context information can in some cases include other information including API version associated with the user, metadata associated with the user, organization, or tenant, and similar information. The STService also calls a getRawSymbolData function that searches the data storage system (DataStore) and/or calls the compiler to obtain the relevant symbol tables that match the parameters of the received query. The data store and/or compiler returns the requested symbol tables to the STService.

The STService calls the filtering service to apply the permissions of the user context to the raw symbol tables. The function call can receive the user context and the raw symbol table information or identifier as parameters. The filtering service can be implemented in the data store in some implementations to enhance security such that the raw symbol table data does not leave the data storage and cannot be accessed until filtered. Implementing the filtering service in the data store can also enhance performance in some configurations by limiting the amount of data that has to be returned to the STService.

Figure 4:
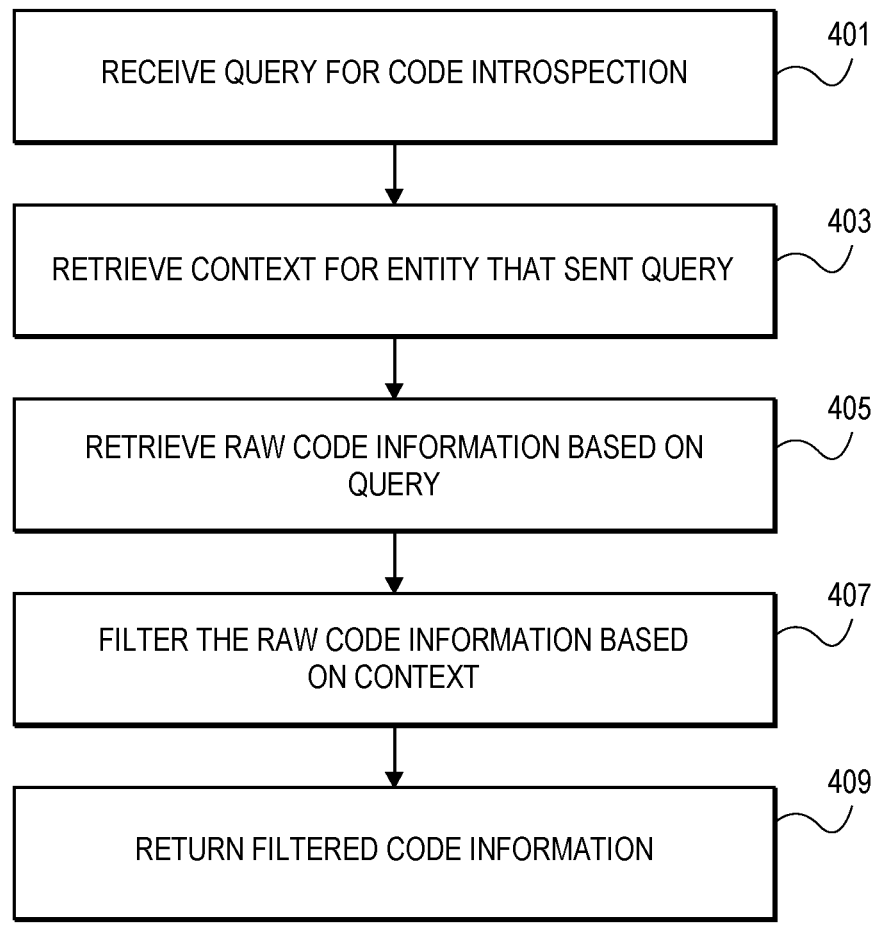
FIG. 4 is a flowchart of a process for code introspection in a multi-tenant system according to some example implementations.

FIG. 4 is a flowchart of a process for code introspection in a multi-tenant system according to some example implementations. The example implementation of FIG. 4 is more general to the operation of a code introspection service in a multi-tenant architecture, in comparison to the specific example of FIG. 3. In this implementation, the code introspection service operates in response to receiving a query for code introspection from a requesting entity (e.g., a user via a user interface, a function call of an API in a user program, or similar entity in the multi-tenant architecture) (Block 401). The code introspection service then retrieves content for the requesting entity that specifies the permissions for code access associated with the entity (Block 403). The context can be retrieved from a separate context service, by searching a database or similar storage system for permissions related to the entity, or by a similar mechanism.

Subsequently or in parallel with obtaining the context information, the code introspection service can obtain raw code information based on the received query (Block 405). The raw code information can be obtained by submitting the query to a database management system or similar data storage system to identify the aspects of the raw code information (e.g., symbol tables, ASTs, or similar descriptive information about the characteristics of code). The code information is 'raw' in the sense that is has not been filtered or processed to enforce multi-tenant architecture constraints on data access for tenants. The raw code information is then processed to apply the permissions defined by the context information for the requesting entity (Block 407). Once the code information system has been filtered according to all of the permissions associated with the requesting user, then the filtered code information can be returned to the requesting entity (Block 409).

Figure 5:
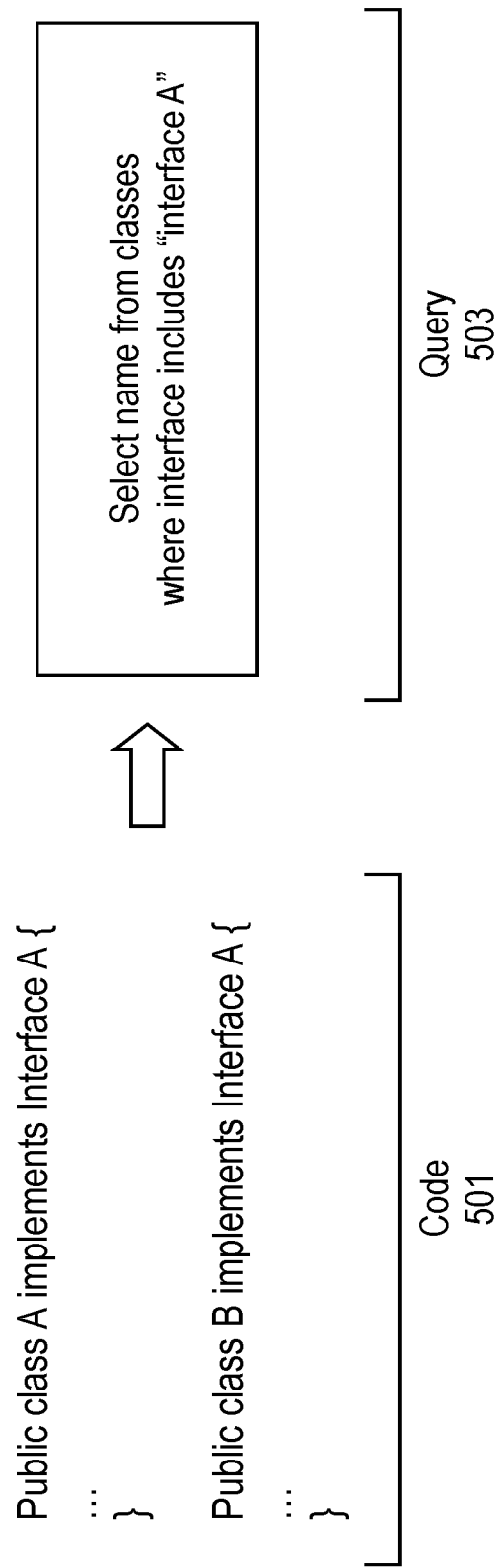
FIG. 5 is a diagram of one implementation of an example set of classes according to some example implementations.

FIG. 5 is a diagram of one set of classes and a query according to some example implementations. In the illustrated example, the compiled code 501 in the data storage includes two classes, A and B, which are described as public classes that each implement an interface A. Associated symbol table or AST information describing these classes is stored in the data storage system. A user can submit an example query 503 to request classes that implement the 'interface A.' Both of the classes implement the interface A and could be returned to the requestor.

Figure 6:
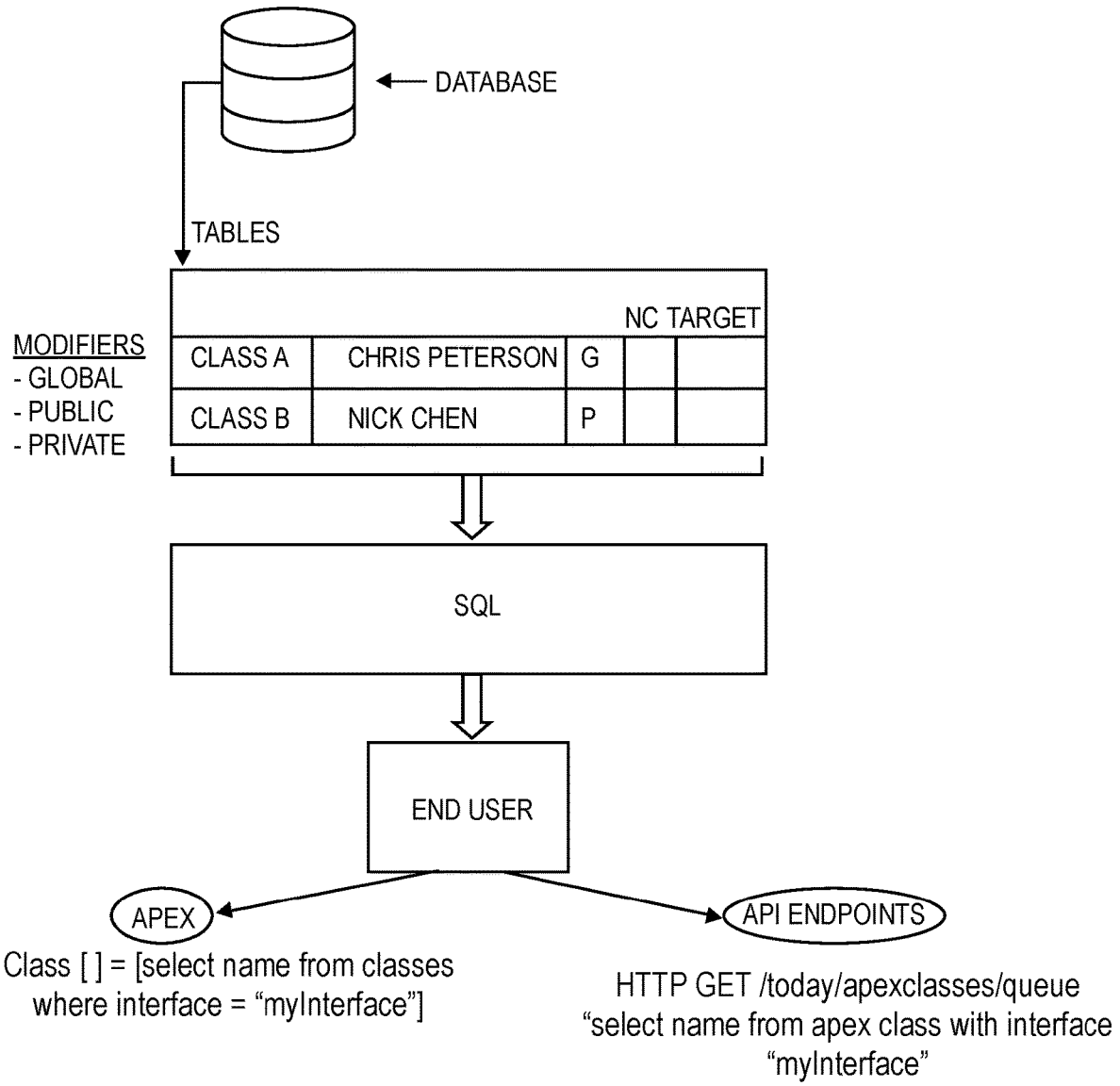
FIG. 6 is a diagram of one implementation of an example query execution according to some example implementations.

FIG. 6 is a diagram of a query execution according to some example implementations. In the example of FIG. 6, the symbol tables for classes A and B are stored in the data storage system, which in this example case is a relational database managed by a relational database management system. The symbol table data stored in the relational database include a name of each class (e.g., classes A and B), owner/user, and permission modifiers (e.g., global, public, private) and similar information. In some embodiments, the class information can be further described to include field information, method, variables, and similar information and metadata. A global modifier would allow any tenant visibility to the class information. Similarly, a public modifier would enable other tenants and user to access the class information. However, a private modifier would deny access to other tenants.

In this example, the submitted query is a structured query language (SQL) query that returns the public class information for Class A, but not the private class information for Class B. This information is returned to the end user whether called via function in user code as handled by a compiler like Apex, or where the end user accesses the code introspection service via API endpoints.

Figure 7:
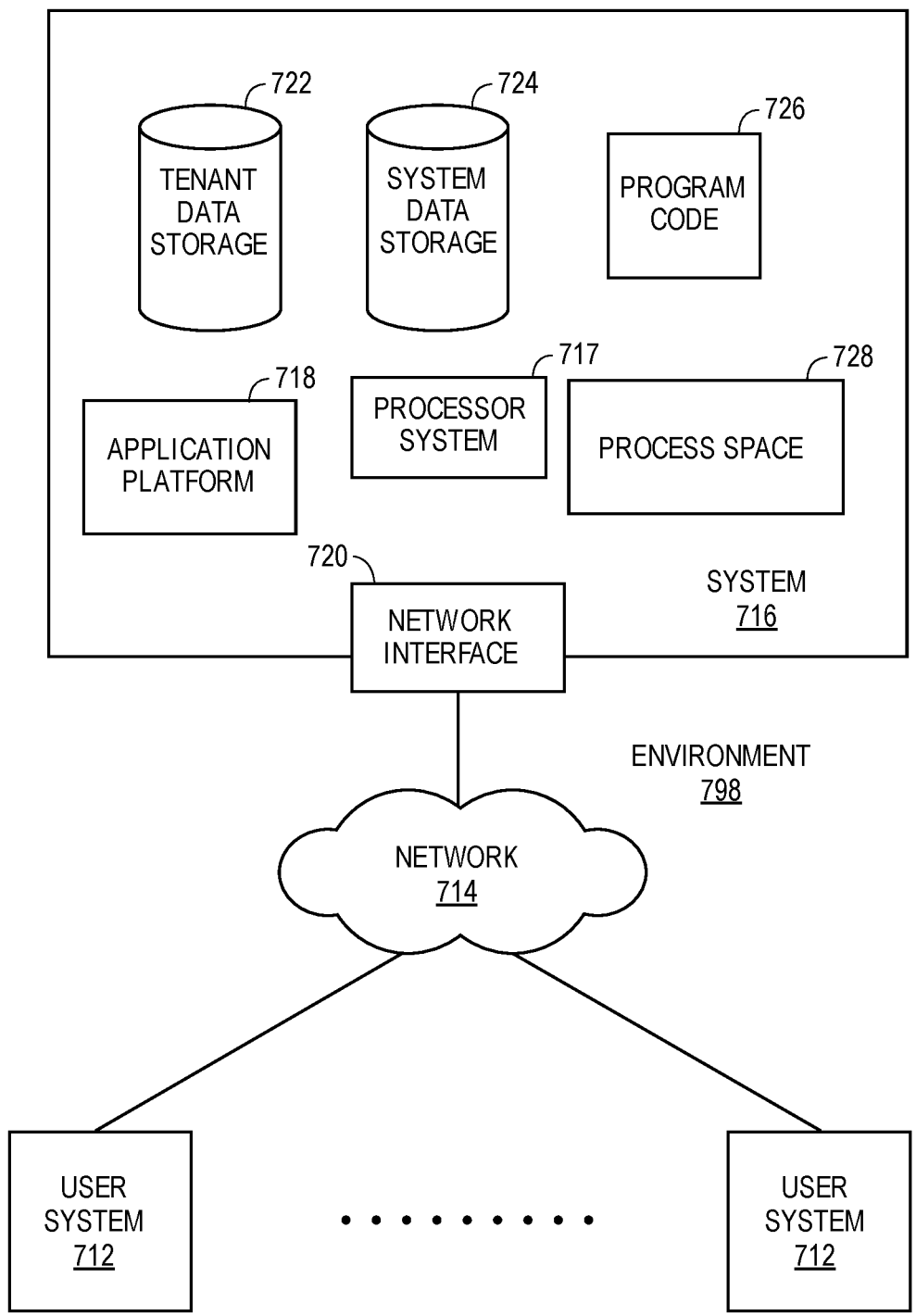
FIG. 7 is a diagram of an execution environment according to some example implementations.

FIG. 7 is a block diagram of an environment in which an on-demand database service may operate in accordance with the described implementations. Environment 798 may include user systems 712, network 714, system 716, processor system 717, application platform 718, network interface 720, tenant data storage 722, system data storage 724, program code 726, and process space 728. In other implementations, environment 798 may not have all of the components listed and/or may have other elements instead of, or in addition to, those listed above.

Environment 798 is an environment in which an on-demand database service exists. User system 712 may be any machine or system that is used by a user to access a database user system. For example, any of user systems 712 may be a handheld computing device, a mobile phone, a laptop computer, a workstation, and/or a network of computing devices. As illustrated in FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" is used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an implementation, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed implementations may utilize are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one implementation, system 716, shown in FIG. 7, implements a verification system. For example, in one implementation, system 716 includes application servers configured to implement and execute verification services software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 716 implements applications other than, or in addition to, verification services. For example, system 716 may provide tenant access to multiple hosted (standard and custom) applications, including verification services application. User (or third party developer) applications, which may or may not include verification services, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 may include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device may be used to access data and applications hosted by system 716, and to perform searches on stored data, and otherwise allows a user to interact with various GUI pages that may be presented to a user. As discussed above, implementations are suitable for use with the Internet, which refers to a specific global internetwork of networks. However, it is understood that other networks may be used instead of the Internet, such as an intranet, an extranet, a virtual private network (VPN), a non-TCP/IP based network, any LAN or WAN or the like.

According to one implementation, each user system 712 and all of its components are operator configurable using applications, such as a browser, including computer code run using a central processing unit such as an Intel, ARM, or AMD processor or the like. Similarly, system 716 (and additional instances of an MTS, where more than one is present) and all of their components might be operator configurable using application(s) including computer code to run using a central processing unit such as processor system 717, which may include an Intel, ARM, or AMD processor or the like, and/or multiple processor units.

According to one implementation, each system 716 is configured to provide webpages, forms, applications, data, and media content to user (client) systems 712 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 8:
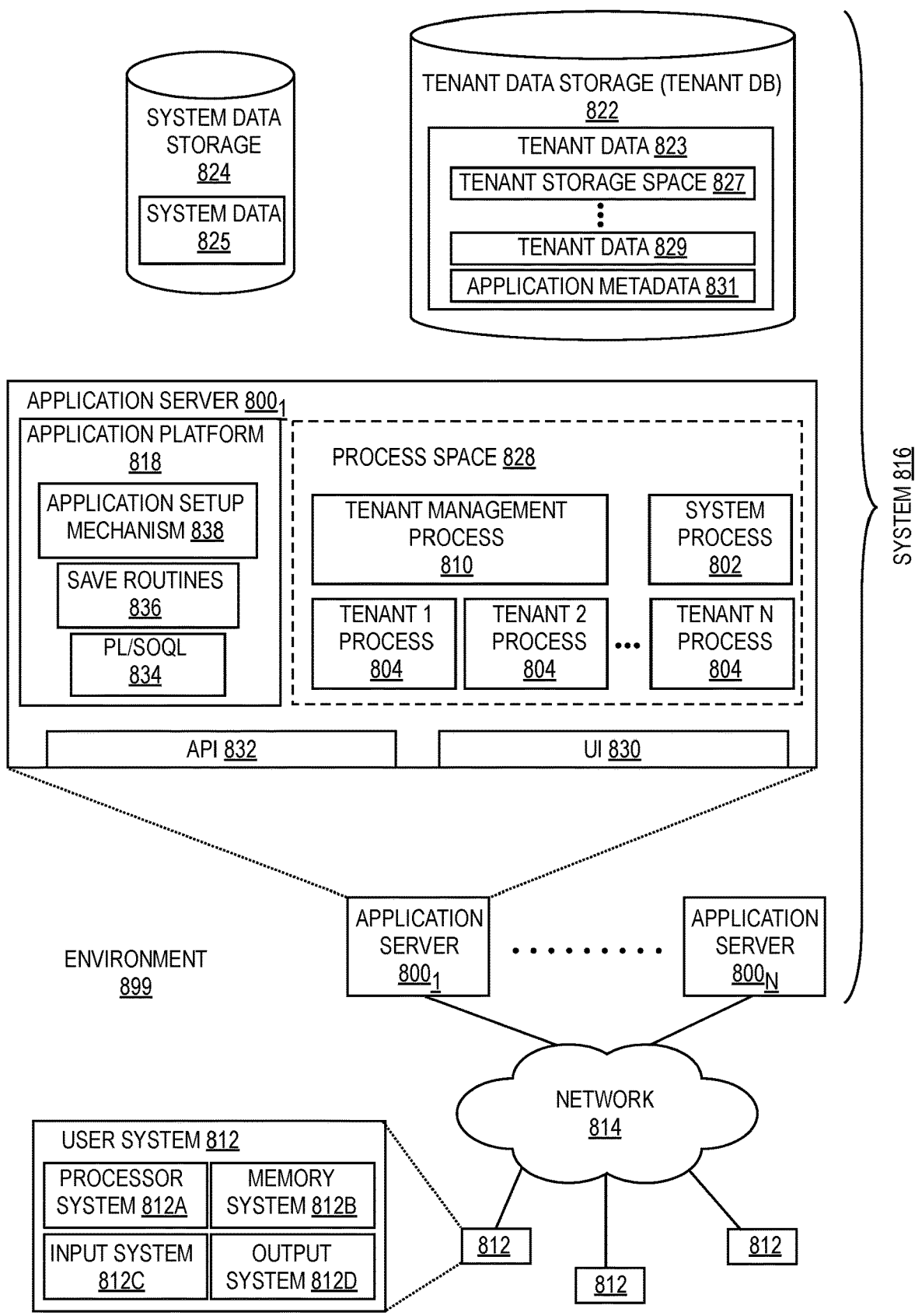
FIG. 8 is a diagram of multi-tenant architecture according to some example implementations.
Figure 9:
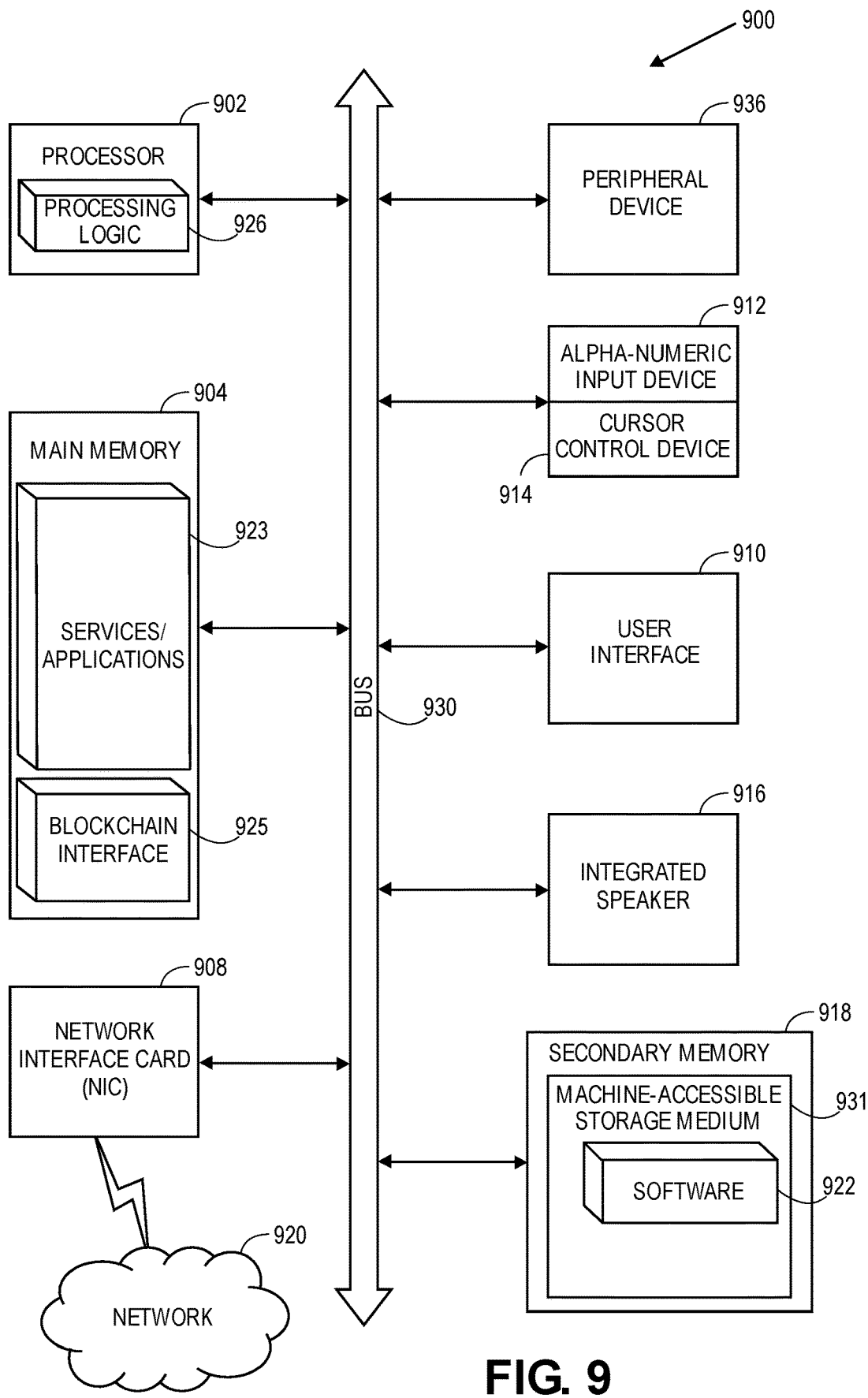
FIG. 9 is a diagram of an electronic device according to some example implementations.

FIG. 8 is another block diagram of an environment in which an on-demand database service may operate in accordance with the described implementations. User system 812 may include a processor system 812A, memory system 812B, input system 812C, and output system 812D. FIG. 9 shows network 814 and system 816. FIG. 8 also shows that system 816 may include tenant data storage 822, having therein tenant data 823, which includes, for example, tenant storage space 827, tenant data 829, and application metadata 831. System data storage 824 is depicted as having therein system data 825. Further depicted within the expanded detail of application servers 800$_{1-N}$ are User Interface (UI) 830, Application Program Interface (API) 832, application platform 818 includes PL/SOQL 834, save routines 836, application setup mechanism 838, process space 828 includes system process space 802, tenant 1-N process spaces 804, and tenant management process space 810. In other implementations, environment 899 may not have the same elements as those listed above and/or may have other elements instead of, or in addition to, those listed above.

User system 812, network 814, system 816, tenant data storage 822, and system data storage 824 were discussed above in FIG. 7. As shown by FIG. 8, system 816 may include a network interface 820 implemented as a set of HTTP application servers 800, an application platform 818, tenant data storage 822, and system data storage 824. Also shown is system process space 802, including individual tenant process spaces 804 and a tenant management process space 810. Each application server 800 may be configured to tenant data storage 822 and the tenant data 823 therein, and system data storage 824 and the system data 825 therein to serve requests of user systems 812. The tenant data 823 might be divided into individual tenant storage areas (e.g., tenant storage space 827), which may be either a physical arrangement and/or a logical arrangement of data. Within each tenant storage space 827, tenant data 829, and application metadata 831 might be similarly allocated for each user. For example, a copy of a user's most recently used (MRU) items might be stored to tenant data 829. Similarly, a copy of MRU items for an entire organization that is a tenant might be stored to tenant storage space 827. A UI 830 provides a user interface and an API 832 provides an application programmer interface into system 816 resident processes to users and/or developers at user systems 812. The tenant data and the system data may be stored in various databases, such as one or more Oracle™ databases.

Application platform 818 includes an application setup mechanism 838 that supports application developers' creation and management of applications, which may be saved as metadata into tenant data storage 822 by save routines 836 for execution by subscribers as one or more tenant process spaces 804 managed by tenant management process space 810 for example. Invocations to such applications may be coded using PL/SOQL 834 that provides a programming language style interface extension to API 832. Invocations to applications may be detected by one or more system processes, which manages retrieving application metadata 831 for the subscriber making the invocation and executing the metadata as an application in a virtual machine.

Each application server 800 may be communicably coupled to database systems, e.g., having access to system data 825 and tenant data 823, via a different network connection. For example, one application server 800$_1$ might be coupled via the network 814 (e.g., the Internet), another application server 800$_{N-1}$ might be coupled via a direct network link, and another application server 800$_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain implementations, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one implementation, therefore, an interface system implementing a load balancing function (e.g., an F5 Big-IP load balancer) is communicably coupled between the application servers 800 and the user systems 812 to distribute requests to the application servers 800. In one implementation, the load balancer uses a least connections algorithm to route user requests to the application servers 800. Other examples of load balancing algorithms, such as round robin and observed response time, also may be used. For example, in certain implementations, three consecutive requests from the same user may hit three different application servers 800, and three requests from different users may hit the same application server 800. In this manner, system 816 is multi-tenant, in which system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals, and progress data, etc., all applicable to that user's personal sales process (e.g., in tenant data storage 822). In an example of a MTS arrangement, since all of the data and the applications to access, view, modify, report, transmit, calculate, etc., may be maintained and accessed by a user system having nothing more than network access, the user may manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain implementations, user systems 812 (which may be client systems) communicate with application servers 800 to request and update system-level and tenant-level data from system 816 that may require sending one or more queries to tenant data storage 822 and/or system data storage 824. System 816 (e.g., an application server 800 in system 816) automatically generates one or more SQL statements (e.g., one or more SQL queries) that are designed to access the desired information. System data storage 824 may generate query plans to access the requested data from the database.

Each database may generally be viewed as a collection of objects, such as a set of logical tables, containing data fitted into predefined categories. A "table" is one representation of a data object and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 9 is a diagram of a machine in the example form of a computer system, in accordance with some implementations. Machine 900 in the exemplary form of a computer system, in accordance with one implementation, within which a set of instructions, for causing the machine/computer system 900 to perform any one or more of the methodologies discussed herein, may be executed. In alternative implementations, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain implementations of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processor 902, a main memory 904 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 918 (e.g., a persistent storage device including hard disk drives and a persistent database and/or a multi-tenant database implementation), which communicate with each other via a bus 930. Main memory 904 includes blockchain verification services or applications 923. Other blockchain interface 925 functions can also be stored in the main memory 904. Main memory 904 and its sub-elements are operable in conjunction with processing logic 926 and processor 902 to perform the methodologies discussed herein.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 1002 is configured to execute the processing logic 926 for performing the operations and functionality which is discussed herein.

The computer system 900 may further include a network interface card 908. The computer system 900 also may include a user interface 910 (such as a video display unit, a liquid crystal display, etc.), an alphanumeric input device 912 (e.g., a keyboard), a cursor control device 914 (e.g., a mouse), and a signal generation device 916 (e.g., an integrated speaker). The computer system 900 may further include peripheral device 936 (e.g., wireless, or wired communication devices, memory devices, storage devices, audio processing devices, video processing devices, etc.).

The secondary memory 918 may include a non-transitory machine-readable storage medium or a non-transitory computer readable storage medium or a non-transitory machine-accessible storage medium 931 on which is stored one or more sets of instructions (e.g., software 922) embodying any one or more of the methodologies or functions described herein. The software 922 may also reside, completely or at least partially, within the main memory 1004 and/or within the processor 902 during execution thereof by the computer system 900, the main memory 904 and the processor 902 also constituting machine-readable storage media. The software 922 may further be transmitted or received over a network 920 via the network interface card 908.

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 10A:
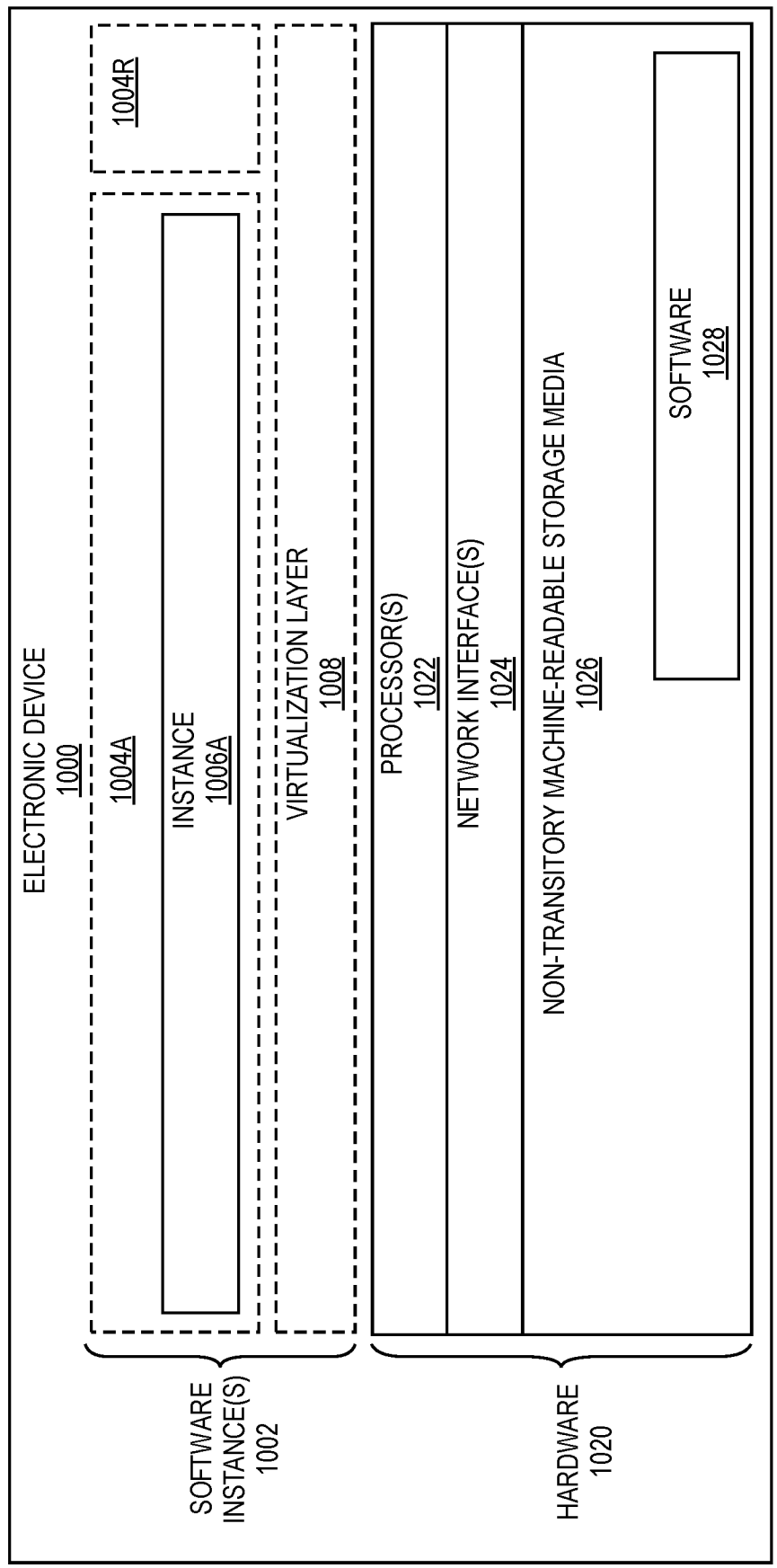
FIG. 10A is a block diagram illustrating an electronic device according to some example implementations.

FIG. 10A is a block diagram illustrating an electronic device 1000 according to some example implementations. FIG. 10A includes hardware 1020 comprising a set of one or more processor(s) 1022, a set of one or more network interfaces 1024 (wireless and/or wired), and non-transitory machine-readable storage media 1026 having stored therein software 1028 (which includes instructions executable by the set of one or more processor(s) 1022). Each of the previously described end user clients and the code introspection service may be implemented in one or more electronic devices 1000. In one implementation: 1) each of the end user clients is implemented in a separate one of the electronic devices 1000 (e.g., in user electronic devices operated by users where the software 1028 represents the software to implement end user clients to interface with the code introspection service (e.g., a web browser, a native client, a portal, a command-line interface, and/or an application program interface (API) based upon protocols such as Simple Object Access Protocol (SOAP), Representational State Transfer (REST), etc.)); 2) the code introspection service is implemented in a separate set of one or more of the electronic devices 1000 (e.g., a set of one or more server electronic devices where the software 1028 represents the software to implement the code introspection service); and 3) in operation, the electronic devices implementing the end user clients and the code introspection service would be communicatively coupled (e.g., by a network) and would establish between them (or through one or more other layers) connections for submitting queries to the code introspection service and returning filtered code information to the end user clients. Other configurations of electronic devices may be used in other implementations (e.g., an implementation in which the end user client and the code introspection service are implemented on a single electronic device 1000).

In electronic devices that use compute virtualization, the set of one or more processor(s) 1022 typically execute software to instantiate a virtualization layer 1008 and software container(s) 1004A-R (e.g., with operating system-level virtualization, the virtualization layer 1008 represents the kernel of an operating system (or a shim executing on a base operating system) that allows for the creation of multiple software containers 1004A-R (representing separate user space instances and also called virtualization engines, virtual private servers, or jails) that may each be used to execute a set of one or more applications; with full virtualization, the virtualization layer 1008 represents a hypervisor (sometimes referred to as a virtual machine monitor (VMM)) or a hypervisor executing on top of a host operating system, and the software containers 1004A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1028 (illustrated as instance 1006A) is executed within the software container 1004A on the virtualization layer 1008. In electronic devices where compute virtualization is not used, the instance 1006A on top of a host operating system is executed on the "bare metal" electronic device 1000. The instantiation of the instance 1006A, as well as the virtualization layer 1008 and software containers 1004A-R if implemented, are collectively referred to as software instance(s) 1002.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 10B:
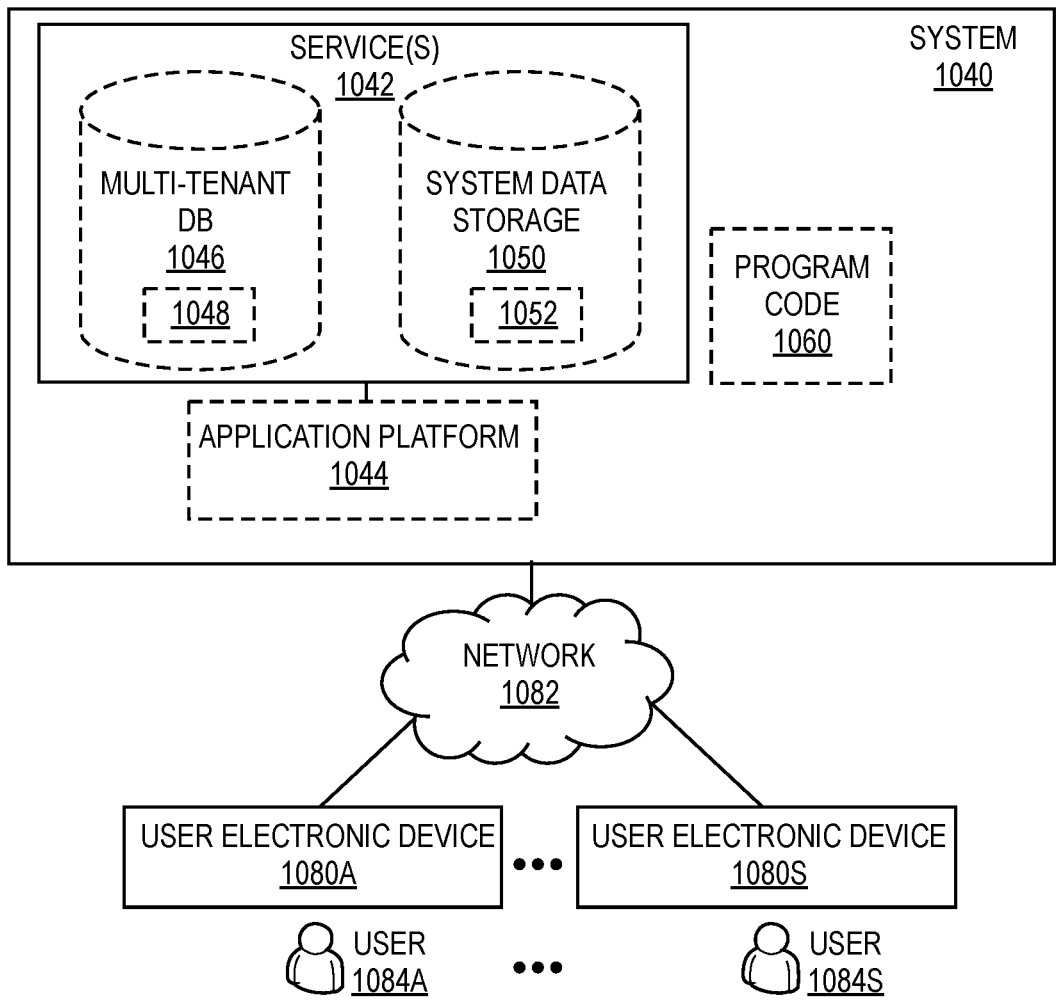
FIG. 10B is a block diagram of an environment where a code introspection service may be deployed, according to some implementations.

FIG. 10B is a block diagram of an environment where a code introspection service may be deployed, according to some implementations. A system 1040 includes hardware (a set of one or more electronic devices) and software to provide service(s) 1042, including the code introspection service. The system 1040 is coupled to user electronic devices 1080A-S over a network 1082. The service(s) 1042 may be on-demand services that are made available to one or more of the users 1084A-S working for one or more other organizations (sometimes referred to as outside users) so that those organizations do not need to necessarily be concerned with building and/or maintaining a system, but instead makes use of the service(s) 1042 when needed (e.g., on the demand of the users 1084A-S). The service(s) 1042 may communication with each other and/or with one or more of the user electronic devices 1080A-S via one or more Application Programming Interface(s) (APIs) (e.g., a Representational State Transfer (REST) API). The user electronic devices 1080A-S are operated by users 1084A-S.

In one implementation, the system 1040 is a multi-tenant cloud computing architecture supporting multiple services, such as a code introspection service, which can be used in conjunction with other services including a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 1040 may include an application platform 1044 that enables PAAS for creating, managing, and executing one or more applications developed by the provider of the application platform 1044, users accessing the system 1040 via one or more of user electronic devices 1080A-S, or third-party application developers accessing the system 1040 via one or more of user electronic devices 1080A-S.

In some implementations, one or more of the service(s) 1042 may utilize one or more multi-tenant databases 1046 for tenant data 1048, as well as system data storage 1050 for system data 1052 accessible to system 1040. In certain implementations, the system 1040 includes a set of one or more servers that are running on server electronic devices and that are configured to handle requests for any authorized user associated with any tenant (there is no server affinity for a user and/or tenant to a specific server). The user electronic device 1080A-S communicate with the server(s) of system 1040 to request and update tenant-level data and system-level data hosted by system 1040, and in response the system 1040 (e.g., one or more servers in system 1040) automatically may generate one or more Structured Query Language (SQL) statements (e.g., one or more SQL queries) that are designed to access the desired information from the one or more multi-tenant database 1046 and/or system data storage 1050.

In some implementations, the service(s) 1042 are implemented using virtual applications dynamically created at run time responsive to queries from the user electronic devices 1080A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1060 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1044 includes an application setup mechanism that supports application developers' creation and management of applications, which may be saved as metadata by save routines. Invocations to such applications, including the code introspection service, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 1082 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 1040 and the user electronic devices 1080A-S.

Each user electronic device 1080A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 1040. For example, the user interface device can be used to access data and applications hosted by system 1040, and to perform searches on stored data, and otherwise allow a user 1084 to interact with various GUI pages that may be presented to a user 1084. User electronic devices 1080A-S might communicate with system 1040 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 1080A-S might include an HTTP client, commonly referred to as a "browser," for sending and receiving HTTP messages to and from server(s) of system 1040, thus allowing users 1084 of the user electronic device 1080A-S to access, process and view information, pages and applications available to it from system 1040 over network 1082.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for code introspection in a multi-tenant architecture, the method comprising:
   receiving from an entity a structured query language (SQL) query for a database that facilitates code introspection, wherein the database stores symbol table data, in an SQL queryable format, generated as part of compiling code for the multi-tenant architecture;
   retrieving context for the entity that sent the query;
   retrieving information, from the database based on the SQL query, regarding the symbol table data;
   filtering the information based on the context; and
   returning the filtered information.

2. The method of claim 1, wherein the entity is a program executing a function that sends the query.

3. The method of claim 1, wherein the entity is a user submitting the query via a command line interface.

4. The method of claim 1, wherein the context defines permissions for a user, organization, and tenant of the multi-tenant architecture.

5. The method of claim 1, wherein the filtering removes one or more portions of the information that the entity lacks permissions to access.

6. The method of claim 1, wherein the information is a symbol table generated by the compiler of the multi-tenant architecture.

7. The method of claim 1, wherein the information is an abstract syntax tree generated by the compiler of the multi-tenant architecture.

8. A non-transitory machine-readable storage medium that provides instructions that, if executed by a processor, will cause said processor to perform operations for code introspection in a multi-tenant architecture, the operations comprising:
   receiving from an entity a structured query language (SQL) query for a database that facilitates code introspection, wherein the database stores symbol table data, in an SQL queryable format, generated as part of compiling code for the multi-tenant architecture;
   retrieving context for the entity that sent the query;
   retrieving information, from the database based on the SQL query, regarding the symbol table data;
   filtering the information based on the context; and
   returning the filtered information.

9. The non-transitory machine-readable storage medium of claim 8, wherein the entity is a program executing a function that sends the query.

10. The non-transitory machine-readable storage medium of claim 8, wherein the entity is a user submitting the query via a command line interface.

11. The non-transitory machine-readable storage medium of claim 8, wherein the context defines permissions for a user, organization, and tenant of the multi-tenant architecture.

12. The non-transitory machine-readable storage medium of claim 8, wherein the filtering removes one or more portions of the information that the entity lacks permissions to access.

13. The non-transitory machine-readable storage medium of claim 8, wherein the information is a symbol table generated by the compiler of the multi-tenant architecture.

14. The non-transitory machine-readable storage medium of claim 8, wherein the information is an abstract syntax tree generated by the compiler of the multi-tenant architecture.

15. A computing device to execute a method for code introspection in a multi-tenant architecture, the computing device comprising:
   a non-transitory machine-readable storage structure to store a database that stores information that was generated by a compiler of the multi-tenant architecture and that relates to compilation processes performed by the compiler, and a code introspection service; and
   a processor coupled to the non-transitory machine-readable storage structure, the processor to execute the code introspection service, the code introspection service to:
      receive from an entity a structured query language (SQL) query for a database that facilitates code introspection, wherein the database stores symbol table data, in an SQL queryable format, generated as part of compiling code for the multi-tenant architecture;
      retrieve context for the entity that sent the query;
      retrieving information, from the database based on the SQL query, regarding the symbol table data;
      filter the information based on the context; and
      return the filtered information.

16. The computing device of claim 15, wherein the entity is a program executing a function that sends the query.

17. The computing device of claim 15, wherein the entity is a user submitting the query via a command line interface.

18. The computing device of claim 15, wherein the context defines permissions for a user, organization, and tenant of the multi-tenant architecture.

19. The computing device of claim 15, wherein the filtering removes one or more portions of the information that the entity lacks permissions to access.

20. The computing device of claim 15, wherein the information is a symbol table generated by the compiler of the multi-tenant architecture.

21. The computing device of claim 15, wherein the information is an abstract syntax tree generated by the compiler of the multi-tenant architecture.

* * * * *